United States Patent [19]

Regnaut

[11] 4,074,020

[45] Feb. 14, 1978

[54] CROSS-FEED FUEL CELL BATTERY WITH FILTER PRESS TYPE STRUCTURE OF POLYGONAL CROSS-SECTION

[75] Inventor: Bernard Regnaut, Antony, France

[73] Assignee: Societe Generale de Constructions Electriques et Mecaniques "Alsthom et Cie", Paris, France

[21] Appl. No.: 654,694

[22] Filed: Feb. 2, 1976

[30] Foreign Application Priority Data

Feb. 6, 1975 France .............................. 75.03663
Feb. 6, 1975 France .............................. 75.03665

[51] Int. Cl.² ........................................... H01M 8/04
[52] U.S. Cl. .................................................... 429/34
[58] Field of Search ............. 136/86 R; 204/270, 269; 429/34

[56] References Cited

U.S. PATENT DOCUMENTS

| | | | |
|---|---|---|---|
| 2,969,315 | 1/1961 | Bacon | 204/270 |
| 3,522,100 | 7/1970 | Lindstrom | 136/86 R |
| 3,746,578 | 7/1973 | Warszawski | 136/86 R |
| 3,806,370 | 4/1974 | Nischik | 136/86 R |

Primary Examiner—Donald L. Walton
Assistant Examiner—H. A. Feeley
Attorney, Agent, or Firm—Flynn & Frishauf

[57] ABSTRACT

The component plates stacked in a filter press type structure in a repeated cathode, separator, anode and conductive plate sequence are of hexagonal or duodecagonal shape with an outer frame carrying the channels for supplying and withdrawing the reagents. Hollowed-out inlet and outlet portions communicating with appropriate channels passing through the frames are provided for passing the reagents across the active portions of the components at a desired cross-feed angle between adjacent units, 30° in some cases and 60° in others.

11 Claims, 7 Drawing Figures

CROSS-FEED FUEL CELL BATTERY WITH FILTER PRESS TYPE STRUCTUTRE OF POLYGONAL CROSS-SECTION

This invention relates to fuel cells and particularly to fuel cell batteries of a structure similar to that of a filter press in which the reagents, namely the fuel, the material supporting combustion and the electrolyte, have a cross-flow at an angle to each other.

Fuel cell batteries of a filter press type of construction are well known. Such a structure is formed by stacking repetitively an elementary sequence of components of plate form, for example a cathode and an anode separated by a separator or diaphragm, one of the faces of the cathode and of the anode being supplied respectively with the material supporting combustion and with the fuel, while the other face of these electrodes is supplied with the electroylyte, all of these components being tightened one against the other by some appropriate means.

In these known types of fuel cell batteries, each of the components is in the form having a frame of square or rectangular shape made of a plastic (i.e. synthetic resin) material in which a central active portion is encased or held, the active portion being a catalytic material in the case of the electrodes and an electrolyte-permeable insulating material in the case of the separator. These frames are pierced at their upper and lower parts by openings which constitute, when the frames are tightened one against the other, supply conduits for the reagents and discharge conduits for the products resulting from the electrochemical process, these openings being made to communicate with the active central part of the appropriate components by means of appropriate microchannels.

It is an object of the present invention to provide a fuel cell battery of simple and readily constructed form in which there is a cross feed of reagents which will be better suited to the cross feeding of three different reagents.

SUMMARY OF THE INVENTION

Briefly, the frames of the plate-like components of the filter press type of structure of the fuel cell battery are made polygonal in contour, with more than four sides and preferably with a contour in the form of a regular hexagon or of a regular dodecagon. Furthermore, the components are assembled in a repeating sequence comprising an elementary sequence of a cathode, a separator, an anode and a current collector, each of these components having substantially equal contour dimensions and being in the shape of thin plates each having a frame made of electrically insulating material holding an active central portion, the faces of the active central portions of the cathode and of the anode which face away from the adjacent separator component being respectively irrigated by the material supporting combustion and by the fuel, whereas the two faces of the central portion of the separator are irrigated by the electrolyte. Each frame not only has a polygonal contour, but its internal contour, as well as its exterior contour is polygonal, the two polygons being similar and concentric and having the sides of one polygon parallel to the corresponding sides of the other. In consequence, the frame may be regarded as formed of trapezoidal panels each bounded along its length by a side of the internal polygon and a side of the external polygon and bounded at each end by a straight line joining similarly oriented vertices of the internal and external polygons. Each of these panels is pierced by at least one opening and when the components are assembled together in filter press form, these openings form six channels or sets of channels, a first channel or set of channels providing for the supply of combustion supporting material to the cathode, a second channel or set of channels providing for supply of the electrolyte to the separator, a third channel or set of channels providing for the supply of fuel to the anode, a fourth channel or set of channels providing for the removal of the used combustion supporting material, a fifth channel or set of channels providing for the removal of the electrolyte and a sixth channel or set of channels providing for the removal of the reaction products of the fuel. In consequence, the average direction of flow of one of these reagents across the component which is specific to it makes a predetermined angle, which is the same in each case, with the average direction of flow of another reagent across the next adjacent component of the cell.

In one form of the invention, the fuel cell battery is made up of components with dodecagonal frames, each of which is, accordingly, formed of twelve trapezoidal panels, each one of which is pierced by one opening. In this case the angle between the flow of reagent across adjacent components is substantially equal to 30° and each supply and discharge function is fulfilled by a pair of channels having a relative displacement of 90°.

In accordance with another form of the invention, the fuel cell battery is made up of components each having a hexagonal shape, the frame then being formed of six trapezoidal panels, each of which is pierced by two openings located symmetrically with respect to each other and with reference to the mid-length of the panel. In this case, the angle between the direction of flow across adjacent components is substantially 60°

Whether this angle is 60° or 30°, it allows all the reagent to have substantial aid from gravity in its flow across an active zone.

BRIEF DESCRIPTION OF THE DRAWINGS

The invention is further described by way of illustrative example with reference to the annexed drawings, in which.

Figure 1:
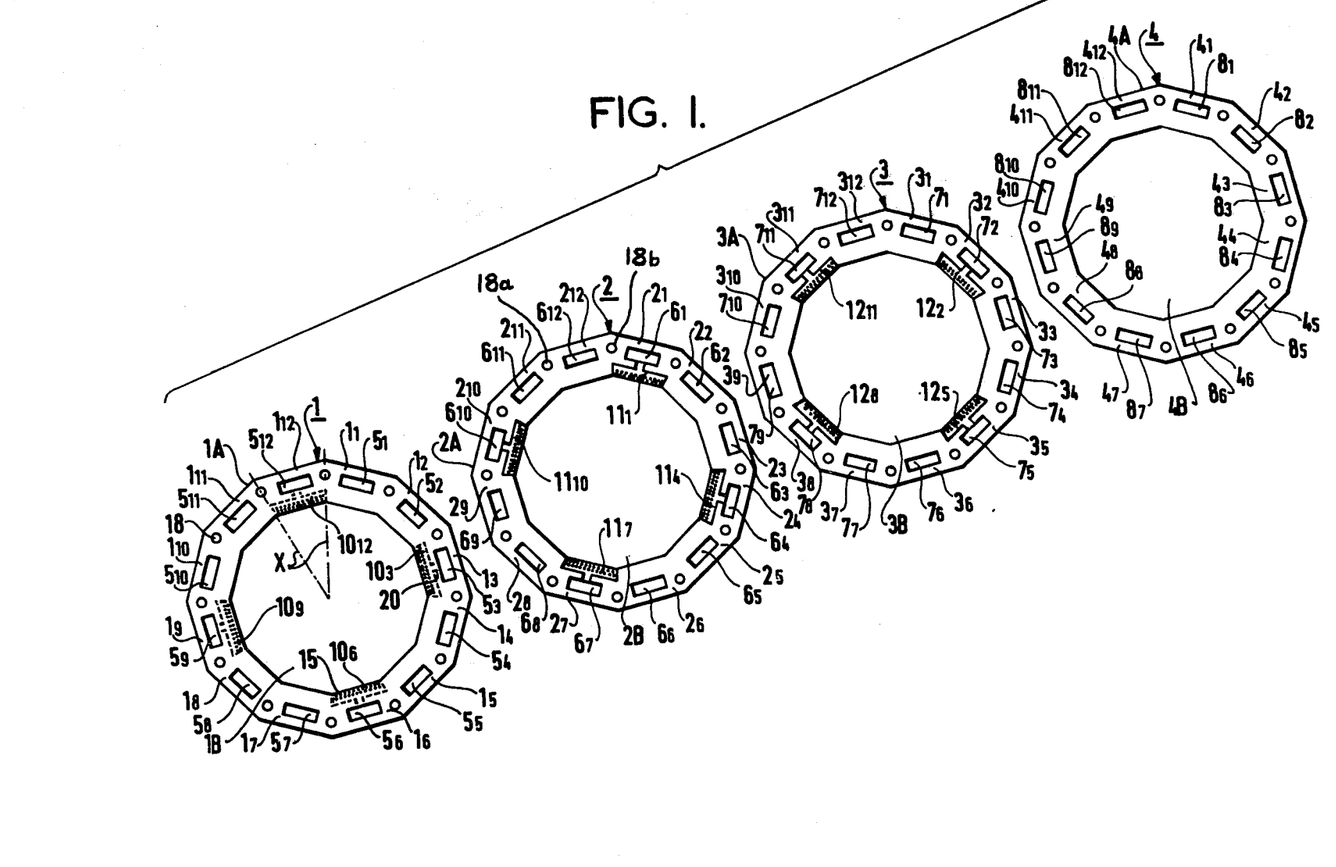
FIG. 1 is an exploded end view of a fuel cell battery with dodecagonal components in accordance with the present invention.

As shown in FIG. 1, a fuel cell battery in accordance with the invention is composed of a stack or assembly in repetitive sequence of components, an elementary sequence being repeated that consists of, successively, a cathode 1, a separator 2, an anode 3 and a current collector 4, this last providing for transport of the electrons towards another cathode (not shown) and so on.

As shown, these components have the same outer dimensions. They are in the form of thin plates, each composed of a frame having a twelve-sided perimeter in the form of a regular dodecagon, the frame holding an active central portion of which no detail is shown in the drawing.

Thus, the cathode 1 is formed of a frame 1A holding a central active portion 1B providing a specific catalyst for the fuel, which fuel may for example be hydrogen and the catalyst carbon. The separator 2 is formed of a frame 2A holding a central portion 2B that is electrically insulating and is irrigated by the electrolyte, which may for example be potassium hydroxide solution of a concentration preferably between 28 and 168 g/l by weight. The anode 3 is formed of a frame 3A holding a central active portion 3B containing a catalyst specific for the material supporting combustion, that material being for example air and the catalyst, for example, finely divided platinum. The current collector 4 is composed of a frame 4A holding a central portion 4B formed of a conductive metal.

As shown in the figure, each frame has a dodecagonal outer shape and a dodecagonal inner shape, the two dodecagons being similar and concentric and with sides that are parallel in two to two correspondence. Therefore, each frame can be regarded as formed of twelve trapezoidal panels $1_1$ to $1_{12}$, such as, by way of example, the panel $1_{12}$ of the frame 1A of the cathode 1, that panel being bounded by the two parallel sides of the respective dodecagons and the straight lines X joining similarly oriented vertices of the respective dodecagons at each end of the said sides.

Each of the panels of the frames 1A, 2A, 3A and 4A is pierced by an opening, for example a rectangular opening such as the opening $5_1$ of the panel $1_1$ of the frame 1A, and there are also bores such as the bore 18 that are designed to receive fastening rods for fastening the components one against the other, for example tension rods tightened by screw threads or some other appropriate means. Of course, all of the frames of the various components have similar characteristics in the respects just mentioned.

Components of the kind illustrated are tightened one against the other by means of threaded tension rods (not shown) engaged in the bores 18. In this manner, the openings provided in the panels of the frames form channels for supply and removal of the reagents as will be further described below. It will further be noted that the average direction of flow of a reagent across the active portion of a component makes an angle of about 30° with the average direction of flow of the neighboring reagent, that is, the reagent flowing across a neighboring component of the same cell.

It may be seen in FIG. 1 that the panels $1_3$, $1_6$, $1_9$ and $1_{12}$ of the frame 1A of the cathode 1 have on one of their faces, shown as the face visible in FIG. 1, hollowed-out portions $10_3$, $10_6$, $10_9$ and $10_{12}$ respectively, each bounded by a side of the interior dodecagon bounding the frame 1A, by the straight lines X and by a straight line parallel to the aforesaid dodecagon side.

The hollowed-out portion $10_3$ communicates with the opening $5_3$ by means of a duct 20 and, in the same manner, the hollowed-out portions $10_6$, $10_9$ and $10_{12}$ communicate respectively with the openings $5_6$, $5_9$ and $5_{12}$ by means of similar ducts 20.

These hollowed-out portions, and likewise all the hollowed-out portions of the other components, are provided with pins 15 providing a more even distribution of the fluids across the active surfaces of the components.

The panels $2_1$, $2_4$, $2_7$ and $2_{10}$ of the frame 2A of the separator 2 respectively have on both of their faces hollowed-out portions $11_1$, $11_4$, $11_7$ and $11_{10}$, these being analogous to the preceding hollowed-out portions.

The hollowed-out portion $11_1$ communicates with the opening $6_1$, while the hollowed-out portions $11_4$, $11_7$ and $11_{10}$ respectively communicate with the openings $6_4$, $6_7$ and $6_{10}$ by means of ducts 20.

The panels $3_2$, $3_5$, $3_8$ and $3_{11}$ of the frame 3A of the anode 3 have respectively on the face which faces the collector 4, the hollowed-out portions $12_2$, $12_5$, $12_8$ and $12_{11}$, which are shaped similarly to the previously described hollowed-out portions.

The hollowed-out portion $12_2$ communicates with the opening $7_2$, while the hollowed-out portions $12_5$, $12_8$ and $12_{11}$ respectively communicate with the openings $7_5$, $7_8$ and $7_{11}$ by means of the ducts 20.

The current collector component 4, however, is not provided with any hollowed-out portions.

It will accordingly be seen that when components of the form just described are tightened one against the other in such a way as to form the filter press type of structure, twelve channels are formed by the openings through the panels of the various components.

In the first place, the openings $5_1$, $6_1$, $7_1$, and $8_1$, on the one hand, and $5_{10}$, $6_{10}$, $7_{10}$ and $8_{10}$, on the other hand, form two channels for supply of the electrolyte to the two faces of the central portion 2B by way of the hollowed-out portions $11_1$ and $11_{10}$ on both sides of the separator 2.

In the second place, the openings $5_9$, $6_9$, $7_9$ and $8_9$, on the one hand, and $5_{12}$, $6_{12}$, $7_{12}$ and $8_{12}$, on the other, form two channels for supply of the combustion supporting material to the active portion 1B of the cathode 1 by way of the hollowed-out portions $10_9$ and $10_{12}$ on the face visible in FIG. 1 of the cathode 1.

In the third place, the openings $5_5$, $6_5$, $7_5$ and $8_5$, on the one hand, and $5_8$, $6_8$, $7_8$ and $8_8$ on the other, form two channels for the removal of the oxidation products of the fuel on the non-visible face of the active portion 3B of the anode 3 towards the exterior by way of the hollowed-out portions $12_5$ and $12_8$ of the anode 3.

In the fourth place, the openings $5_4$, $6_4$, $7_4$ and $8_4$ on the one hand, and $5_7$, $6_7$, $7_7$ and $8_7$ on the other, form two channels for removal of the electrolyte after irrigation of the two faces of the central portion 2B of the separator 2 towards the exterior by way of the hollowed-out portions $11_4$ and $11_7$ on both sides of the aforesaid separator 2.

In the fifth place, the openings $5_3$, $6_3$, $7_3$ and $8_3$ on the other hand, and $5_6$, $6_6$, $7_6$ and $8_6$ on the other hand, form two channels for removal of the used combustion supporting materials after irrigation thereby of the visible face of the active portion 1B of the cathode 1 towards the exterior by way of the hollowed-out portions $10_3$ and $10_6$ of the cathode 1.

Finally, in the sixth place, the openings $5_2$, $6_2$, $7_2$ and $8_2$ on the one hand, and $5_{11}$, $6_{11}$, $7_{11}$ and $8_{11}$ on the other hand, form two channels for supply of the fuel to the face of the active portion 3B of the anode 3 that is not visible in the figure by way of the hollowed-out portions $12_2$ and $12_{11}$ of the anode 3.

Figure 2:
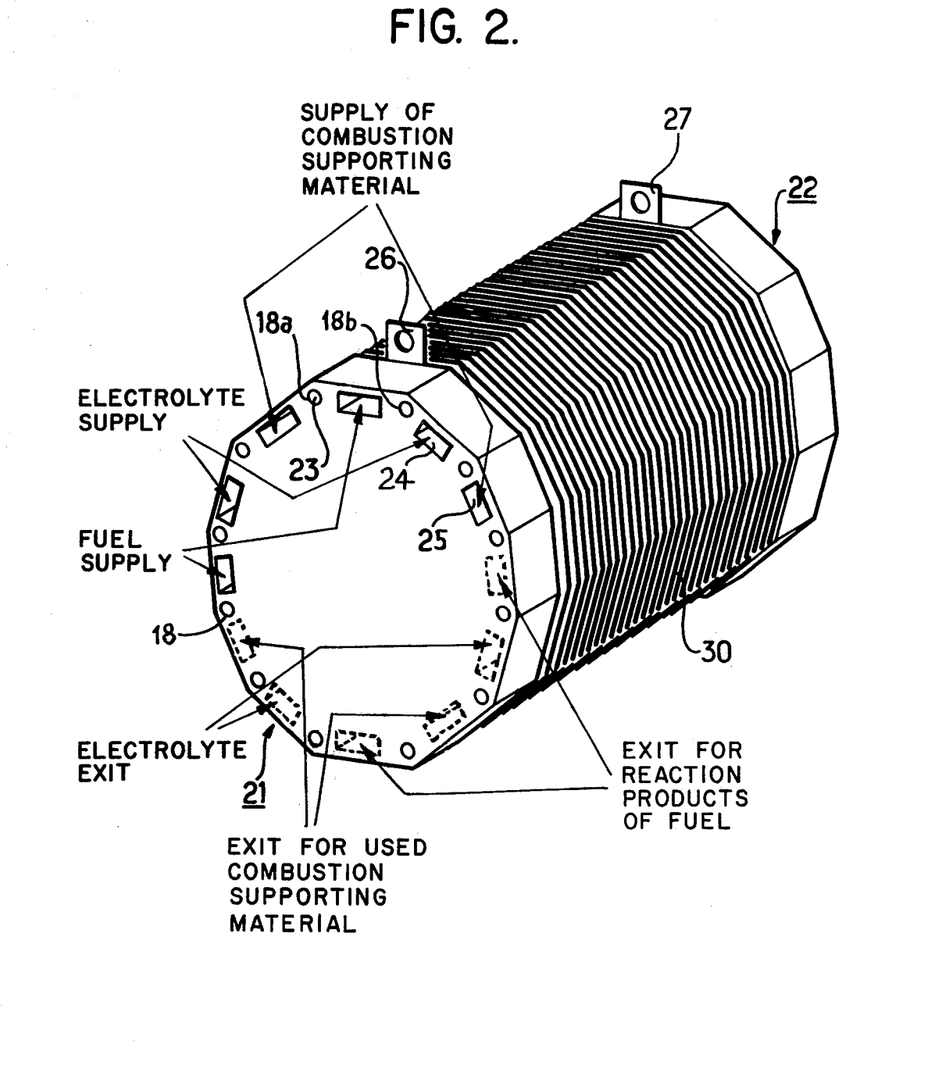
FIG. 2 is a perspective view of an assembled fuel cell battery with dodecagonal components.

FIG. 2 shows a fuel cell battery according to the invention in its assembled form.

Reference numeral 30, accordingly, indicates the components as previously described, stacked in accordance with the sequence likewise described, and tightened one against the other between the two end plates 21 and 22 cooperating with tightening rods 23 passing through the bores 18. Of course, these end plates have openings such as 24 and 25 of the plate 21 disposed in alignment with the openings described by reference to the preceding figure and assuring for example supply of the various reagents for the battery. Of course, the plate 22 is provided with similar openings, not shown in the figure, but corresponding to the channels of which the position is shown in broken lines on the plate 21 and serving for removal of the products of the reaction occurring in the cells of the battery. If in the example described all reagents are to be aided as much and as symmetrically as possible by gravity in their flow across active areas, the bore 18a should be at the top, rather than the bore 18b (FIG. 1) or the channel shown at the top in FIG. 2, which corresponds to the channel $5_2$, $6_2$, $7_2$, $8_2$ of FIG. 1.

Finally, at 26 and 27 appear the current collector terminals for the current generated in the battery.

Figure 3:
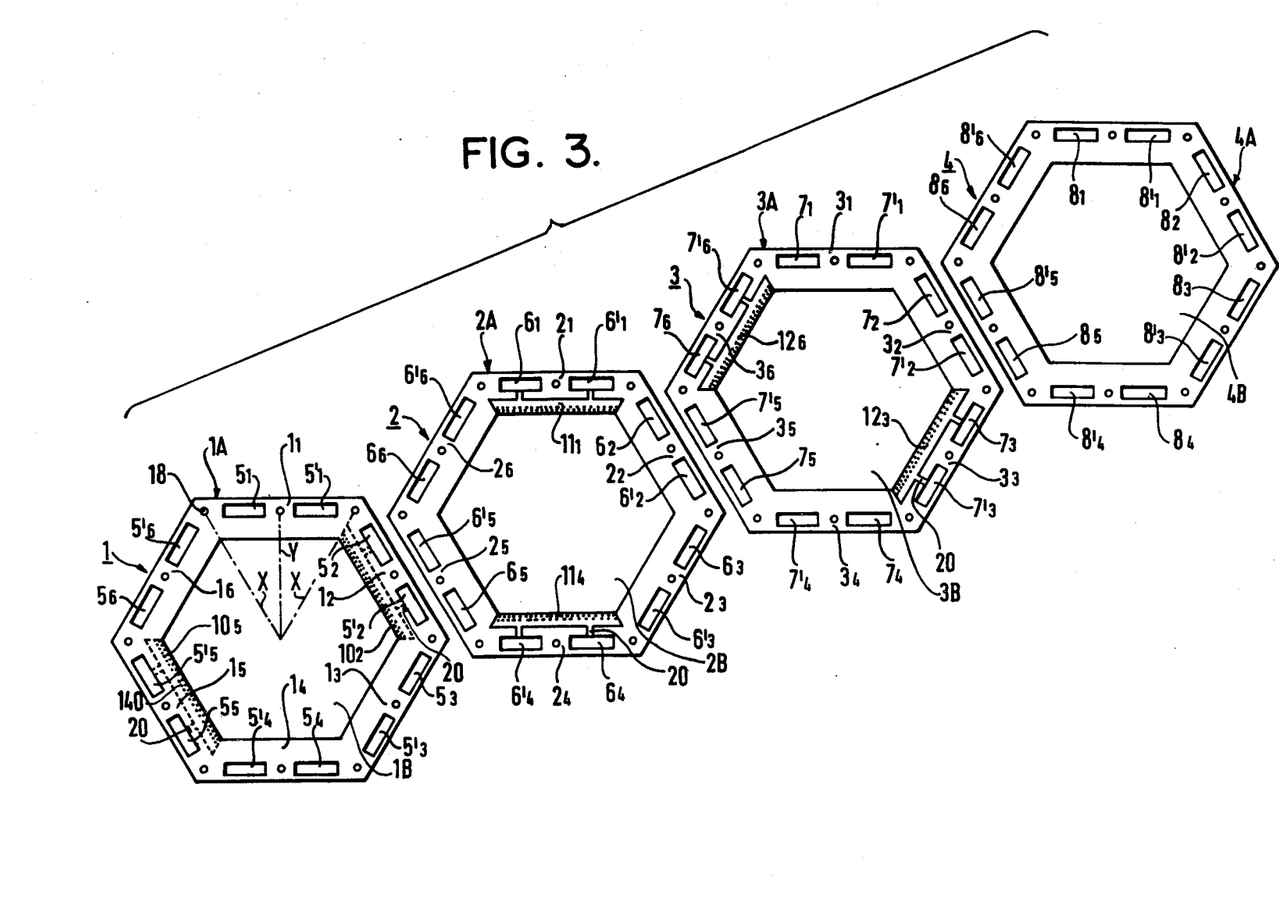
FIG. 3 is an exploded view of a first embodiment of a fuel cell battery according to the invention with hexagonal components.

FIGS. 3 to 7 illustrate a hexagonal battery in accordance with the invention. There will first be described with reference to FIG. 3, for example, the characteristics common to the four embodiments of the hexagonal fuel cell battery, the differences among which will thereafter be explained with reference to FIGS. 3 to 6 successively. Thus, as shown in FIG. 3, a fuel cell battery according to the invention is formed of a repetitive stack or assembly of an elementary sequence of components, namely successively a cathode 1, a separator 2, an anode 3 and a current collector 4, the last providing for transport of the electrons towards another cathode (not shown) and so on.

These components have the same outer dimensions and shapes and are in the form of thin plates each consisting of a frame having a perimeter in the shape of a regular hexagon, each frame holding and enclosing a central active portion.

Thus, the cathode 1 is the formed of the frame 1A holding a central active portion 1B including a catalyst specific for the fuel, which fuel is for example hydrogen, the catalyst being carbon. Similarly, the separator 2 is constituted of a frame 2A holding and surrounding a central portion 2B that is electrically insulating, for example paper impregnated with an epoxide resin and irrigated by the electrolyte, such as potassium hydroxide solution. The anode 3 is formed of a frame 3A enclosing and holding an active central portion 3B which provides a catalyst specific for the material supporting combustion, this catalyst being nickel or a platinoid material (platinum, palladium, irridium, osmium or the like), the combustion supporting material being air in this particular example. The collector 4 is composed of a frame 4A holding and enclosing a central portion 4B formed of a conductive metal such as nickel.

As shown in drawing, each frame is bounded by two similar concentric hexagons with parallel sides. As the result, each frame can be regarded as made up of six trspezoidal panels such as, for example, the panel $1_1$ of the frame 1A of the cathode 1, this panel being bounded by two parallel sides respectively belonging to the internal and external hexagons and by the straight lines X joining the corresponding vertices of the hexagons.

Each one of the panels of the frames 1A, 2A, 3A and 4A is provided with two openings, those illustrated being of rectangular shape and of equal area, for example the openings $5_1$ and $5'_1$ of the panel $1_1$ of the frame 1A, each pair of openings of a panel being disposed symmetrically relative to the mid-length, which is to say relative to the median Y of the trapezoid. The panels are also pierced by bores such as the bores 18 which are suitable to receive fastening means for fastening the components one against the other, for example tension bolts or other appropriate devices.

Of course, the frames of the other components have similar characteristics.

In order to simplify the description, the subscript 1 will be applied to the frame number to indicate the top panel of the frame of each of the components, this panel being disposed in a position that is substantially horizontal in the figures and the other panels, in clockwise sequence, will be indicated by subscripts 2 to 6. For example, the frame 1A of the cathode 1 is formed of the successive panels $1_1$, $1_2$ ... $1_6$. In all of the embodiments shown in this and following figures, the components are tightened one against the other by means of clamping bolts not shown in the drawing that are passed through the bores 18. As the result, the openings just described that are provided in the panels of the frames form channels for supply and removal of the reagents, as will be further described below.

It will further be observed that in the cell of FIG. 3 the average direction of flow of a reagent across the active portion of a component forms an angle of about 60° with that of the next reagent in sequence, which is to say with the reagent flowing across the active portion of the next adjacent component. In the first of this series of embodiments which is shown in FIG. 3, it will be seen that the panels $1_2$ and $1_5$ of the frame 1A of the cathode 1 are provided, on one of their faces, in this particular case on the face visible in FIG. 1, with hollowed-out portions $10_2$ and $10_5$ respectively, each bounded by one side of the interior hexagon that forms the boundary of the frame 1A, by the straight lines X and by a straight line parallel to the aforesaid hexagon side. The hollowed-out portion $10_2$ communicates with the openings $5_2$ and $5'_2$ by means of ducts 20 and similarly the hollowed-out portion $10_5$ communicates with the openings $5_5$ and $5'_5$ by means of similar ducts 20. As described, these hollowed-out portions are in the nature of stepped areas. These hollowed-out portions and, likewise, all the similar hollowed-out portions of the other components, both in this embodiment and in the others described and to be described, are provided with an array of pins 140 that have the function of providing a better distribution of the flow of liquid or gas over the active surfaces of the components.

The panels $2_1$ and $2_4$ of the frame 2A of the separator 2 are provided on both of their faces with hollowed-out portions $11_1$ and $11_4$, respectively, these being shaped in a manner analogous to those already described. The cavity $11_1$ communicates with the openings $6_1$ and $6'_1$, while the cavity $11_4$ communicates with the openings $6_4$ and $6'_4$ by means of ducts 20 as before.

The panels $3_3$ and $3_6$ of the frame 3A of the anode 3 are provided, on the face of this component which faces the collector 4, with hollowed-out portions $12_3$ and $12_6$, respectively, which are analogous to those already described. The cavity $12_3$ communicates with the openings $7_3$ and $7'_3$ and the cavity $12_6$ communicates with the openings $7_6$ and $7'_6$ by means of ducts 20 as before. The current collector component, however, has no hollowed-out portions in its frame.

Thus, when components of the kinds described above are tightened one against the other in such a way as to form a filter press structure, twelve channels are formed by the openings of the various frames which are of course brought into registry in the assembly.

In the first place, the openings $5_1$, $6_1$, $7_1$ and $8_1$ on the one hand, and $5'_1$, $6'_1$, $7'_1$ and $8'_1$ on the other, form two channels for supply of the electrolyte on both the faces of the central portion 2B of the separator 2, by way of the hollowed-out portions $11_1$ (one on each side of the frame).

In the second place, the openings $5_2$, $6_2$, $7_2$ and $8_2$ on the one hand, and $5'_2$, $6'_2$, $7'_2$ and $8'_2$ on the other, form two channels for supply of the combustion supporting material to the face of the active portion 1B of the cathode 1 which is visible in the drawing by way of the hollowed-out cavity $10_2$ of the cathode 1.

In the third place, the openings $5_3$, $6_3$, $7_3$ and $8_3$ on the one hand, and $5'_3$, $6'_3$, $7'_3$ and $8'_3$ on the other, form two channels for removal of the oxidation products of the fuel from the face of the active portion 3B of the anode 3 that is visible in the drawing by way of the hollowed-out portion $12_3$.

In the fourth place, the openings $5_4$, $6_4$, $7_4$ and $8_4$ on the one hand, and $5'_4$, $6'_4$, $7'_4$ and $8'_4$ on the other, form two channels for removal of the electrolyte after irrigation of both faces of the central portion 2B of the separator 2 by way of the hollowed-out portions $11_4$ on both sides of the frame of the separator 2.

In the fifth place, the openings $5_5$, $6_5$, $7_5$ and $8_5$ on the one hand, and $5'_5$, $6'_5$, $7'_5$ and $8'_5$ on the other, form two channels for removal of the used combustion supporting material after irrigation thereby of the face of the active portion 1B of the cathode 1 which is visible in the drawing by way of the hollowed-out portion $10_5$ of the cathode 1.

In the sixth place, the openings $5_6$, $6_6$, $7_6$ and $8_6$ on the one hand, and $5'_6$, $6'_6$, $7'_6$ and $8'_6$ on the other, form two channels for supply of fuel to the face of the active portion 3B of the anode 3 which is not visible in the drawing by way of the hollowed-out portion $12_6$ of the anode 3.

Figure 4:
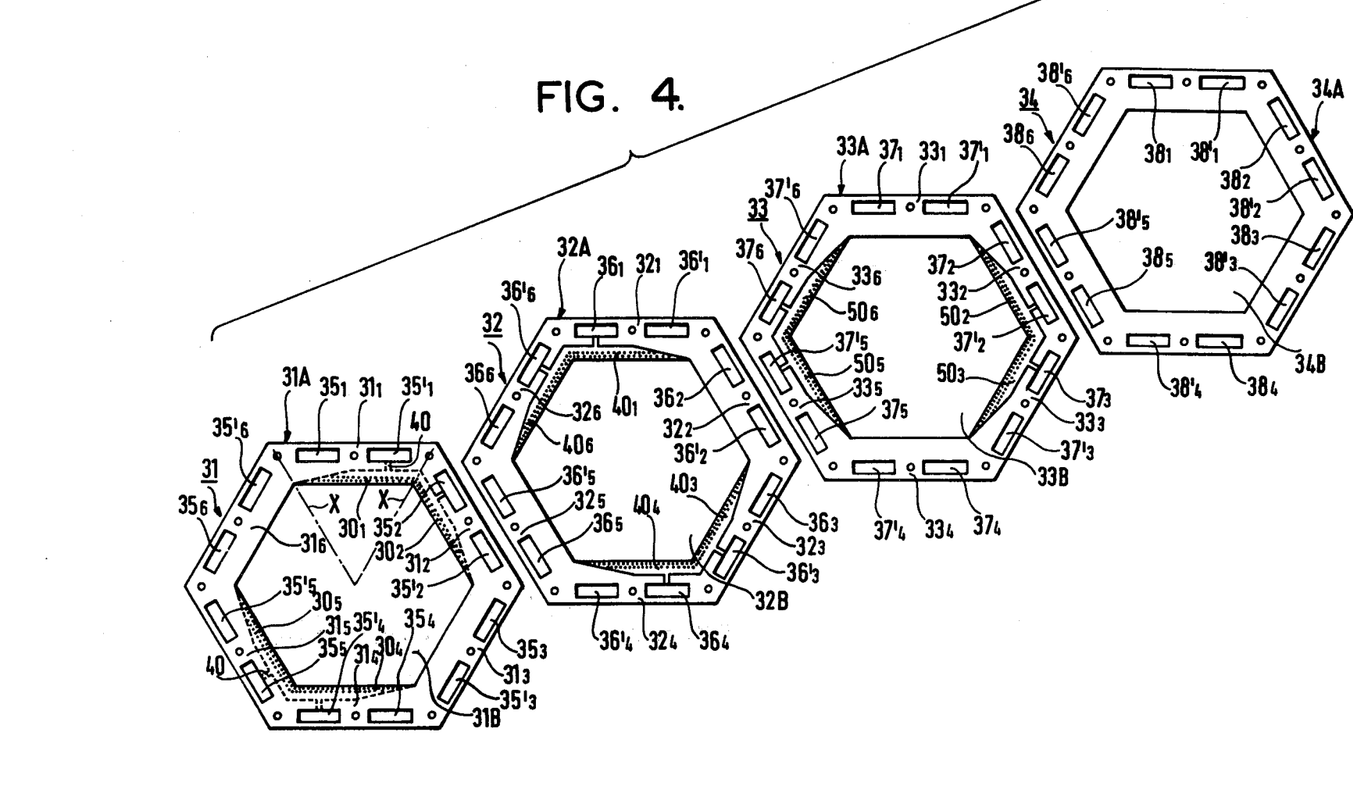
FIG. 4 is an exploded view of a second embodiment of a fuel cell battery according to the invention with hexagonal components.

In a second embodiment of the hexagonal form of the invention illustrated in FIG. 4, the hollowed-out portions run the length of two sides of the internal hexagon and are tapered near their ends. Thus, on the frame 31A of the cathode 31, the panels $31_1$ and $31_2$ have adjoining hollowed-out portions $30_1$ and $30_2$ that communicate at their boundary and the panels $31_4$ and $31_5$ are, likewise, provided with adjoining hollowed-out portions $30_4$ and $30_5$, respectively. These hollowed-out portions are on only one face of the frame, in this case the face that is visible on the figure. Each of these hollowed-out portions of a single panel is bounded by a side of the interior hexagon forming the boundary of frame 31A, by a straight line joining similarly oriented vertices of the interior and exterior hexagons, by a straight line parallel to the aforesaid hexagon side for a length substantially equal to half of the hexagon side and by a straght line joining the last-mentioned line to the adjacent vertex of the interior hexagon.

The cavity $30_1$ communicates with the opening $35'_1$ by means of a duct 40 and in the same manner, the cavity $30_2$ communicates with the opening $35_2$ by means of a similar duct 40. As already noted, the cavities $30_1$ and $30_2$ communicate with each other and, likewise, the cavity $30_4$ communicates with the opening $35_4$ and the cavity $30_5$ with the opening $35_5$; these cavities communicating also with each other.

The panels $32_6$ and $32_1$ as well as the panels $32_3$ and $32_4$ of the frame 32A of the separator 32 are provided on both of the faces of the frame with hollowed-out portions $40_6$, $40_1$ and $40_3$, $40_4$, respectively, which are similar to those described above. The cavity $40_6$ communicates with the opening $36'_6$ and the cavity $40_1$ communicates with opening $36_1$, these cavities communicating with each other also.

Likewise, the cavity $40_3$ communicates with the opening $36'_3$ and the cavity $40_4$ with the opening $36_4$, these cavities communicating also with each other.

The panels $33_2$ and $33_3$, as well as the panels $35_5$ and $33_6$ of the frame 33A of the anode 33, are provided, on the face of the anode that faces the current collector 34, with cavities $50_2$, $50_3$ and $50_5$, $50_6$, respectively, these being similar to those described above, as is evident from the drawing.

The cavity $50_2$ communicates with the opening $37'_2$ and the cavity $50_3$ communicates with the opening $37_3$, these cavities communicating also with each other.

Likewise, the cavity $50_5$ communicates with the opening $37'_5$ and the cavity $50_6$ communicates with the opening $37_6$, these cavities also communicating with each other. The current collector 34, as before, is provided with no inlet or outlet cavities in its frame.

It follows that when components such as those described are tightened together one against the other in the manner of forming a filter press type of structure, twelve channels are provided by the registry of the openings of the respective components. Firstly, the openings $35'_6$, $36'_6$, $37'_6$ and $38'_6$ on the one hand, and $35_1$, $36_1$, $37_1$ and $38_1$ on the other, form two channels for supplying the electrolyte to both faces of the central active portion 32B of the separator 32 by way of the hollowed-out portions $40_6$ and $40_1$ provided on both sides of the frame of the separator.

Secondly, the openings $35'_1$, $36'_1$, $37'_1$ and $38'_1$ on the one hand, and $35_2$, $36_2$, $37_2$ and $38_2$ on the other, form two channels for supplying the combustion supporting material to the face of the active portion 31B of the cathode 1 that is visible on the figure, by way of the hollowed-out portions $30_1$ and $30_2$.

Thirdly, the openings $35'_2$, $36'_2$, $37'_2$ and $38'_2$ on the one hand, and $35_3$, $36_3$, $37_3$ and $38_3$ on the other, form two channels for removing the oxidation products of the fuel from the face of the active portion 33B of the anode 33, which is not visible in the drawing, by way of the hollowed-out portions $50_2$ and $50_3$ of the anode 33.

Fourthly, the openings $35'_3$, $36'_3$, $37'_3$ and $38'_3$ on the one hand, and $35_4$, $36_4$, $37_4$ and $38_4$ on the other, form two channels for removal to the outside of the electrolyte after irrigation of both faces of the central portion 32B of the separator 32, by way of the hollowed-out portions $40_3$ and $40_4$ that are provided on both sides of the separator.

Fifthly, the openings $35'_4$, $36'_4$, $37'_4$ and $38'_4$ on the one hand, and $35_5$, $36_5$, $37_5$ and $38_5$ on the other, form two channels for removal of the consumed fuel after irrigation of the face of the active portion 31B of the cathode 31 which is visible in the figure, by way of the hollowed-out portions $30_4$ and $30_5$ of the cathode 31.

Sixthly, the openings $35'_5$, $36'_5$, $37'_5$ and $38'_5$ on the one hand, and $35_6$, $36_6$, $37_6$ and $38_6$ on the other, form two channels for supplying fuel to the face of the active portion 33B of the anode 33 which is not visible in the drawing, by way of the hollowed-out portions $50_5$ and $50_6$.

Figure 5:
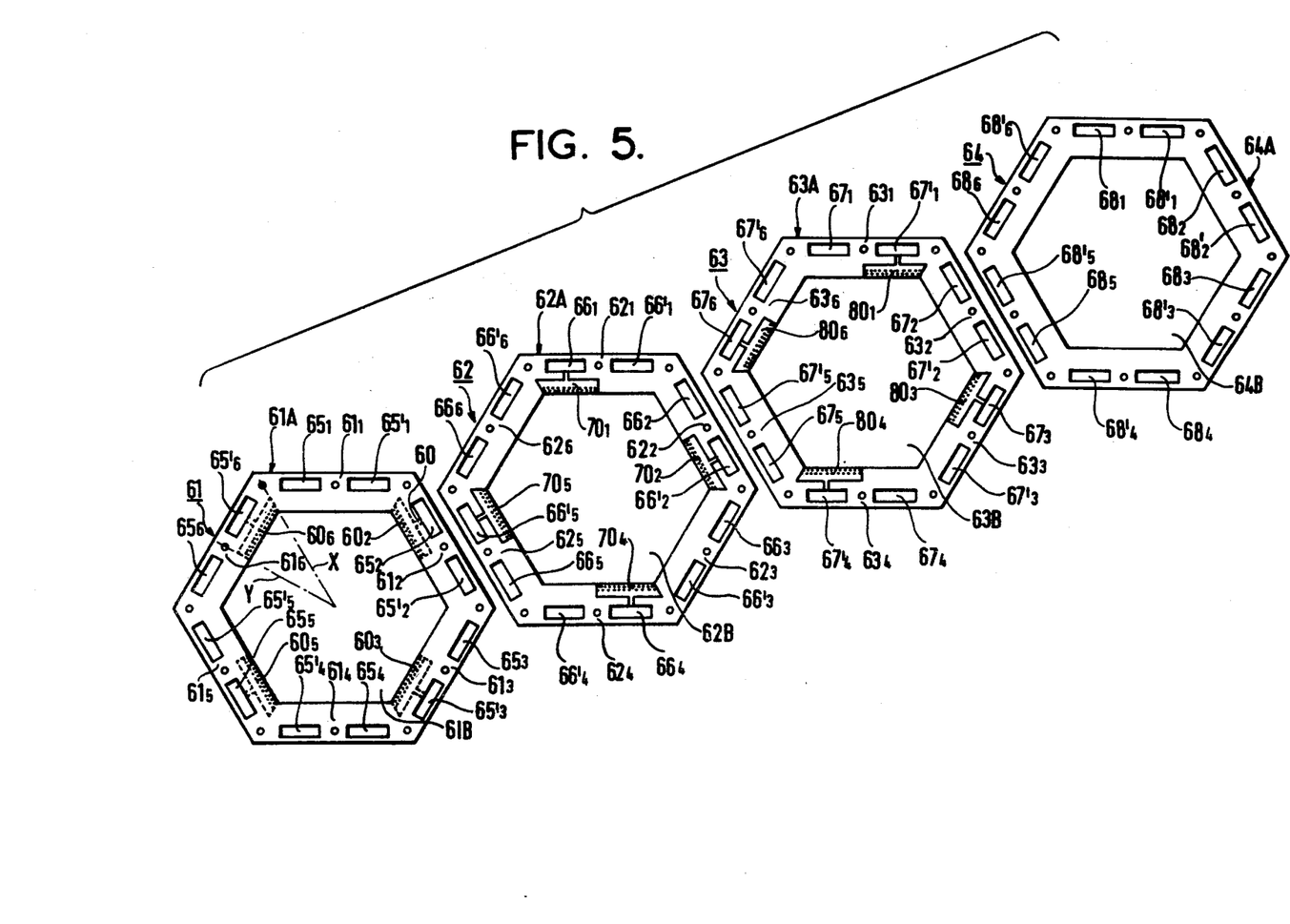
FIG. 5 is an exploded view of a third embodiment of a fuel cell battery according to the invention with hexagonal components.

A third embodiment of the invention using frames of hexagonal outline is illustrated in FIG. 5. In this case, the hollowed-out portions are provided only along half the length of the inner hexagon side. Thus, the panels $61_2$, $61_3$, $61_5$ and $61_6$ of the frame 61A of the cathode 61 are provided on their faces, more particularly, the face visible on the figure, with hollowed-out portions $60_2$, $60_3$, $60_5$ and $60_6$ respectively, each bounded by substantially half of a side of the interior hexagon that forms the boundary of the frame 61A, about half of a straight line X joining adjacents vertices of the two hexagons, about half of the length of the median Y of the panel and a straight line parallel to the said hexagon side.

The cavity $60_2$ communicates with the opening $65_2$ by means of a duct 60 and similarly, the cavity $60_3$ communicates with the opening $65'_3$ and the cavities $60_5$ and $60_6$ communicate respectively with the openings $65_5$ and $65'_6$ in the same manner.

The panels $62_1$, $62_2$, $62_4$ and $62_5$ of the frame 62A of the separator 62 are provided on both of their faces with hollowed-out portions $70_1$, $70_2$, $70_4$ and $70_5$, respectively, which are similar to those previously described.

The cavity $70_1$ communicates with the opening $66_1$, the cavity $70_2$ communicates with the opening $66'_2$ and the cavities $70_4$ and $70_5$ communicate respectively with the openings $66_4$ and $66'_5$.

The panels $63_1$, $63_3$, $63_4$ and $63_6$ of the frame 63A of the anode 63 are provided on the face of the frame which faces the collector 64 with hollowed-out portions $80_1$, $80_3$, $80_4$ and $80_6$ respectively, which are similar to those previously described The cavity $80_1$ communicates with the opening $67'_1$, the cavity $80_3$ communicates with the opening $67_3$ and the cavities $80_4$ and $80_6$ communicates respectively with the openings $67'_4$ and $67_6$.

The collector 64, as in other cases, does not have any hollowed-out portions on its frame.

Thus, when components such as those just described are tightened one against the other in such a way as to form a filter press structure, twelve channels are formed by registry of the openings in the various components.

Firstly, the openings $65_1$, $66_1$, $67_1$ and $68_1$ on the one hand, and $65'_2$, $66'_2$, $67'_2$ and $68'_2$ on the other, form two channels for supplying the electrolyte to both faces of the central portion 62B of the separator 62, by way of the hollowed-out portions $70_1$ and $70_2$ which are provided on both sides of the separator frame.

Secondly, the openings $65_2$, $66_2$, $67_2$ and $68_2$ on the one hand, and $65'_3$, $66'_3$, $67'_3$ and $68'_3$ on the other, form two channels for supply of the combustion supporting material to the face of the active portion 61B of the cathode 61, which is visible in the figure, by way of the hollowed-out portions $60_2$ and $60_3$ of the frame of the cathode 61.

Thirdly, the openings $65_3$, $66_3$, $67_3$ and $68_3$ on the one hand, and $65'_4$, $66'_4$, $67'_4$ and $68'_4$ on the other, form two channels for removal of the oxidation products of the fuel from the face of the active portion 63B of the anode 63, which is visible in the figure, by way of the cavities $80_3$ and $80_4$ of the frame of the anode 61.

Fourthly, the openings $65_4$, $66_4$, $67_4$ and $68_4$ on the one hand, and $65'_5$, $66'_5$, $67'_5$ and $68'_5$ on the other, form channels for removing the electrolyte after irrigation of both faces of the central portion 62B of the separator 62, by way of the cavities $70_4$ and $70_5$ provided on both sides of the frame of the separator 62.

Fifthly, the openings $65_5$, $66_5$, $67_5$ and $68_5$ on the one hand, and $65'_6$, $66'_6$, $67'_6$ and $68'_6$ on the other, form two channels for removing the used combustion supporting material after irrigation thereby of a face of the active portion 61B of the cathode 61 which is visible in the figure, by way of the hollowed-out portions $60_5$ and $60_6$ of the frame of the cathode 61.

Sixthly, the openings $65'_1$, $66'_1$, $67'_1$ and $68'_1$ on one hand, and $65_6$, $66_6$, $67_6$ and $68_6$ on the other, form two channels for supplying fuel to the face of the active portion 63B of the anode 63 which is not visible in the figure, by way of the hollowed-out portions $80_1$ and $80_6$ of the anode frame.

In this case, as in the case of the embodiment of FIG. 1, the difference in the angle of flow of reagents of adjacent components of a cell is 30°, whereas in the cases of FIGS. 3 and 4, it was 60°.

Figure 6:
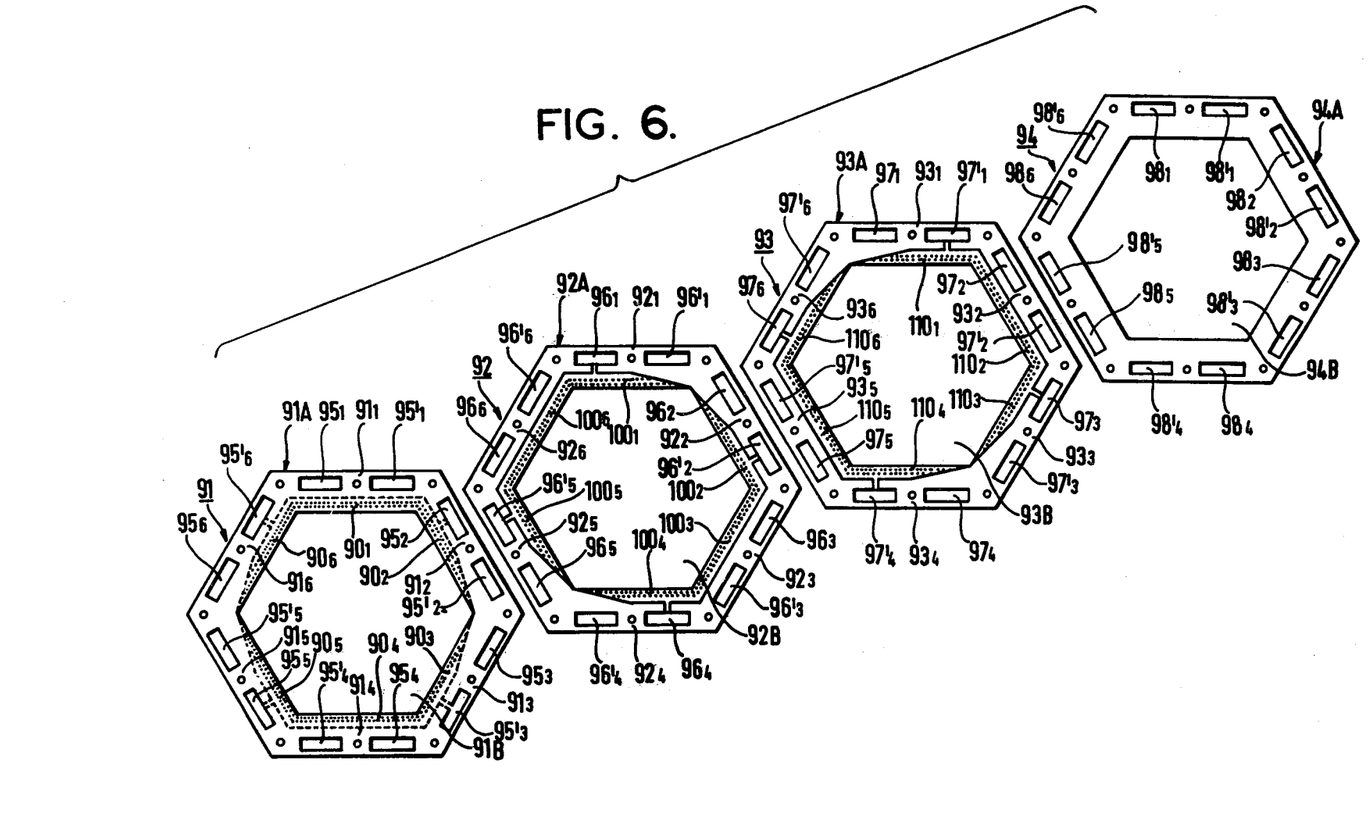
FIG. 6 is an exploded view of a fourth embodiment of a fuel cell battery in accordance with the invention with hexagonal components.

In a fourth embodiment of the form of the invention utilizing hexagonal components, where the difference in the angle of flow of reagents of adjacents is again 60°, shown in FIG. 6, all of the panels of the hexagonal frames have either one or two hollowed-out portions on their internal edges. Thus, all of the panels of the frame 91A of the cathode 91 have a hollowed-out portion on one of their faces, more particularly the face visible in FIG. 6. More exactly, the panels $91_1$ and $91_4$ each have a hollowed-out portion $90_1$ and $90_4$ respectively, such as those described with reference to FIG. 3, while the other panels each have a hollowed-out portion such as those described with reference to FIG. 5. It will further be seen that the hollowed-out portion $90_1$ of the panel $91_1$ communicates with the hollowed-out portions $90_2$ and $90_6$ of the adjacent panels and that similarly the hollowed-out portion $90_4$ of the panel 91 communicates with the hollowed-out portions $90_3$ and $90_5$ of the panels adjacent to the panel $91_4$. Furthermore, the hollowed-out portions $90_2$ and $90_6$ communicate with the openings $95_2$ and $95'_6$, while the hollowed-out portions $90_3$ and $90_5$ communicate with the openings $95'_3$ and $95_5$ respectively.

In the same manner, all of the panels of the frame 92A of the separator 92 are provided with hollowed-out portions on both of their faces. More exactly, the panels $92_6$ and $92_3$ each have on both sides hollowed-out portions $100_6$ and $100_3$ respectively, such as those described with reference to FIG. 3, whereas the other panels each have on both sides hollowed-out portions such as those described with reference to FIG. 5. It will be observed that the hollowed-out portion $100_6$ of the panel 92 communicates with the hollowed-out portions $100_5$ and $100_1$ of the adjoining panels and that similarly the hollowed-out portion $100_3$ of the panel $92_3$ communicates with the hollowed-out portions $100_2$ and $100_4$ of the adjoining panels. Furthermore, the hollowed-out portions $100_5$ and $100_1$ communicate with the openings $96'_5$ and $96_1$, while the hollowed-out portions $100_2$ and $100_4$ communicate with the openings $96'_2$ and $96_4$ respectively.

Similarly, all of the panels of the frame 93A of the anode 93 have a hollowed-out portion on the face of the frame that faces the current collector 94. More exactly, the panels $93_2$ and $93_5$ each have a hollowed-out portion $110_2$ and $110_5$ respectively, such as those described with reference to FIG. 3, whereas the other panels each have a hollowed-out portion such as those described with reference to FIG. 5. It will be seen that the hollowed-out portion $110_2$ of the panel $93_2$ communicates with the hollowed-out portions $110_2$ and $110_3$ of the neighboring panels, and likewise the hollowed-out portion $110_5$ of the panel $93_5$ communicates with the hollowed-out portions $110_4$ and $110_6$ of the neighboring panels. Furthermore, the hollowed-out portions $110_1$ and $110_3$ communicate with the openings $97'_1$ and $97_3$ and the hollowed-out portions $110_4$ and $110_6$ communicate with the openings $97'_4$ and $97_6$ respectively.

As in previous cases, the frame of the collector 94 has no hollowed-out portions.

It follows that when components such as those just described are tightened together in such a way as to form a filter press structure, twelve channels are formed by registry of the openings of the various component frames.

Firstly, the openings $95_1$, $96_1$, $97_1$ and $98_1$ on one hand, and $95'_5$, $96'_5$, $97'_5$ and $98'_5$ on the other, form two channels for supplying the electrolyte to both faces of the central portion 92B of the separator 92, by way of the cavities $100_1$, $100_5$ and $100_6$ provided on both sides of the separator frame.

Secondly, the openings $95'_6$, $96'_6$, $97'_6$ and $98'_6$ on one hand, and $95_2$, $96_2$, $97_2$ and $98_2$ on the other, from two channels for supplying the combustion supporting material on the face of the active portion 91B of the cathode 91 which is visible in the figure, by way of the cavities $90_1$, $90_2$ and $90_6$ of the cathode frame.

Thirdly, the openings $95_6$, $96_6$, $97_6$ and $98_6$ on one hand, and $95'_4$, $96'_4$, $97'_4$ and $98'_4$ on the other, form two channels for removing the oxidation products of the fuel from the face of the active portion 93B of the anode 93 that is not visible on the figure, by way of cavities $110_4$, $110_5$ and $110_6$ of the anode frame.

Fourthly, the openings $95'_2$, $96'_2$, $97'_2$ and $98'_2$ on one hand, and $95_4$, $96_4$, $97_4$ and $98_4$ on the other, form two channels for removal of the electrolyte after irrigation by it of both faces of the central portion 92B of the separator 92, by way of the cavities $100_2$, $100_3$ and $100_4$ provided on both sides of the separator frame.

Fifthly, the openings $95'_3$, $96'_3$, $97'_3$ and $98'_3$ on one hand, and $95_5$, $96_5$, $97_5$ and $98_5$ on the other, form two channels for removing the used combustion supporting material after irrigation thereby of the face of the active portion 91B of the cathode 91 which is visible in the figure, by way of the cavities $90_3$, $90_4$ and $90_5$ of the cathode frame.

Sixthly, the openings $95'_1$, $96'_1$, $97'_1$ and $98'_1$ on one hand, and $95_3$, $96_3$, $97_3$ and $98_3$ on the other, form two channels for supplying fuel to the face of the active portion 93B of the anode 93 which is not visible in the figure, by way of the cavities $110_1$, $110_2$ and $110_3$ of the anode frame.

Figure 7:
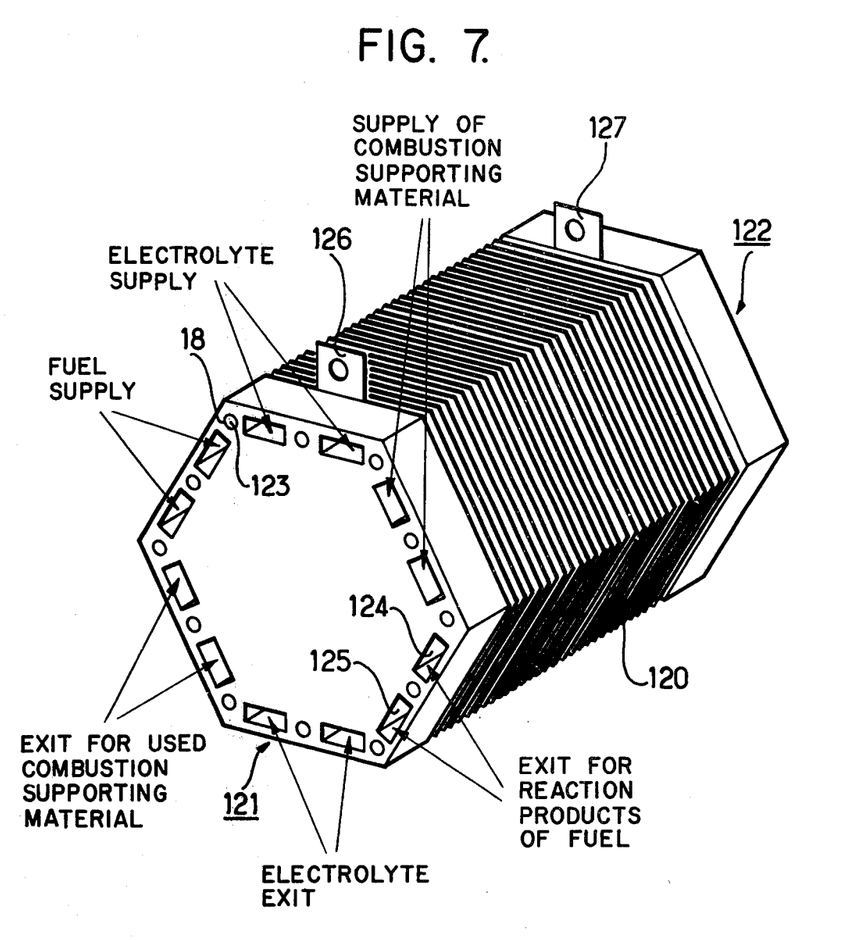
FIG. 7 is a perspective view of an assembled fuel cell battery with hexagonal components in accordance with the invention.

FIG. 7 shows the assembly of a fuel cell battery according to the invention utilizing hexagonal components, which may be a fuel cell battery according to any of the figures 3, 4, 5 or 6. The reference numeral 120 thus indicates components such as those described with reference to one of the figures just mentioned, stacked according to the sequence which has also been described above and tightened together between two end plates 121 and 122 cooperating with tightening members 123 passing through the bore 18. One or both of these end plates may be provided with openings, such as the openings 124 and 125 of the plate 121, which are in registry with the openings of the frames of the various components as described in FIGS. 3 through 6, for supplying and removing the various reagents for the battery. Both the supply and the removal may be provided at one end plate such as the plate 121, as shown in FIG. 7. If desired, the supply and the removal of reagents may be done simultaneously at both ends, in which case the plate 122 would have openings such as those shown on the plate 121 in FIG. 7. On the other hand, it may be convenient to provide the supply openings in one of the plates and the reagent removal openings in the other of the plates, as described with reference to FIG. 2.

The terminals at which the current is generated in the battery may be taken off to the exterior.

It is, accordingly, seen that the fuel cell battery according to the present invention is, in its various forms, made up of components that are of identical form all provided with frames that can be made by all well-known ways of shaping a synthetic resin material. Such a fuel cell battery is accordingly manufacturable readily on an industrial scale. Furthermore, the cross-feed provided for the reagents makes possible a better irrigation of the active surfaces of the electrodes, without depriving the flow of any of the reagents of the assistance of gravity. Finally, the dodecagonal or hexagonal shape makes it possible to group together a number of batteries into compact assemblies in honeycomb fashion and, thus, to make available a high level of electric power per unit of volume.

As a practical example, a fuel cell battery of 20 cells illustrates the capabilities of the fuel cell batteries of the present invention. In this case, each of the cells was made up of a set of components such as those described above, having in each case an active portion of a cross-sectional area of 100cm$^2$.

This battery delivers an e.m.f. of 0.8 volts per cell, that is, per elementary sequence of components, thus a total of 16 volts for the battery, at a minimum total power of 161 watts. The fuel is hydrogen and the combustion supporting material is air.

It is also possible to use hydrocarbons as fuel and also alcohols, notably methanol, and the combustion supporting material may be air or oxygen.

Although the invention has been described with reference to particular illustrative embodiments and a particular practical example has been referred to, these examples are given simply by way of illustration, and modifications and variations in detail may be made within the scope of the inventive concept. For example, in batteries of very great perimeter, it may be desirable to have triplets of openings instead of pairs of openings for supply and removal of each reagent, in order to provide adequate distribution of the reagents across the surface of the active areas while providing adequate places for a sufficient number of tightening means to hold the structure together without leakage of the reagents from the supply and removal channels to the wrong elements of the battery. Furthermore, dodecagonal components may be designed for a 60° difference in flow angle in adjacent components of a cell rather than for 30°, by having the hollowed-out inlets and outlets on the inside of the frames arranged like those of FIG. 3, rather than like those of FIGS. 1 and 5.

I claim:

1. A fuel cell battery formed of an assembly similar to that of a filter press comprising plate-like components in a repeating order of sequence embodying the elementary cell sequence of a cathode, a separator, an anode and a current collector, each of said components having substantially the same contour and being in the form of thin plates having an outer frame of an electrically insulating material surrounding a central active portion, the respective faces of the respective active portions of the cathode and anode components which face away from the separator component being respectively irrigated by the combustion supporting material and by the fuel, while the two faces of the separator component are irrigated by the electrolyte, said fuel cell battery being characterized by the improvement wherein:

the said frame of each of said components has a perimeter in the shape of a first regular polygon and an inner contour in the shape of a second regular polygon similar to and concentric with said first regular polygon and having sides parallel to those of said first regular polygon, so that said frame may be regarded as constituted of trapezoidal panels extending between two lines joining similarly oriented corners of the respective polygons;

each of said trapezoidal panels has at least one opening;

said openings of said panels of said frames together forming six sets of channels in which each set consists of at least one channel, of which one of said sets of channels is arranged for supply of combustion supporting material to the active portions of said cathode components, a second of said sets of channels is arranged for supply of electrolyte to both of the separator faces, a third set of said channels is arranged for supply of fuel to the active portions of the anode components, a fourth of said sets of channels is arranged for removal of used combustion supporting material, a fifth of said sets of channels is arranged for removal of the electrolyte and a sixth of said sets of channels is arranged to remove the reaction products of the fuel, and said channels and their connections to the respective active portions of the respective components of said battery are so disposed that the average direction of flow of said electrolyte across said separator faces is at the same predetermined acute angle to the respective average directions of flow of said fuel and of said combustion supporting material across the active portions respectively of said anode and said cathode in the same cell.

2. A fuel cell battery as defined in claim 1, in which said polygons are regular dodecagons, said frame of each component is formed of twelve trapezoidal panels each having one of said openings, and said predetermined angle is substantially equal to 30°.

3. A fuel cell battery as defined in claim 2, in which each frame of a cathode component, of a separator component and of an anode component has four of said panels disposed in pairs of opposite panels, each of which is provided with a hollowed-out portion in the form of a rabbet along substantially the entire internal length of said panel which is provided with a connecting duct for communication of said hollowed-out portion with the aforesaid opening of said panel, and in which said hollowed-out portions are provided on both sides of said separator frame, but only on one side of said cathode and anode frames.

4. A fuel cell battery as defined in claim 3, in which each of said hollowed-out portions is provided with an array of pins for evenly distributing the flow of material across said hollowed-out portions.

5. A fuel cell battery as defined in claim 1, in which said polygons are regular hexagons, the frame of each of said components is formed of six of said trapezoidal panels, each of which has at least one of said openings.

6. A fuel cell battery as defined in claim 5, in which only one set of said channels passes through any one of said openings and in which the frames of the cathode components, the separator components and the anode components each have two oppositely located panels in each of which a hollowed-out portion is provided along substantially the entire, length of the shorter parallel side of the trapezoid and a plurality of ducts are provided for enabling different parts of said hollowed-out portion to communicate with the set of channels passing through said panel, and in which, further, said hollowed-out portions are provided on both sides of the frames of said separator components but on one side of the frames of said cathode and anode components, and in which, further, said predetermined angle is 60°.

7. A fuel cell batter as defined in claim 5, in which the frame of each of the cathode components, separator components and anode components comprises four panels arranged in opposite pairs of adjacent panels each of which panels is provided with a hollowed-out portion along one side of the interior hexagon for substantially the full length of that side, which hollowed-out portion is provided with a duct for communication of said hollowed-out portion with one of the said openings of the panel, and in which the hollowed-out portions of two adjacent panels each of which is provided with a hollowed-out portion, communicate one with the other, and in which further, said predetermined angle is 60°.

8. A fuel cell battery as defined in claim 5, in which each of the frames of the cathode components, the separator components and the anode components has four panels arranged in opposite pairs of nonadjacent panels each having a hollowed-out portion along half the length of a side of the interior hexagon, each hollowed-out portion of a panel being provided with a duct for communication of said hollowed-out portion with the opening of said panel nearer said hollowed-out portion, the hollowed-out portions of two opposed panels of the frame being substantially symmetrically located with reference to the common center of the internal and external hexagons, and in which, further, said predetermined angle is 30°.

9. A fuel cell battery as defined in claim 5, in which the frames of the cathode components, of the separator components and of the anode components have hollowed-out portions along the inside boundary of each of the six panels of the frame, two opposed panels having hollowed-out portions of substantially equal depth along the whole internal length of the panel, and the remainder of the panels having hollowed-out portions communicating with the hollowed-out portion of the adjacent one of said two opposed panels and having a depth which tapers down to the end of the hollowed-out portion remote from said one of said opposed panels, tapering over substantially half of the internal length of the panel, each of the panels having tapered hollowed-out portions as aforesaid also having a duct connecting it with the opening of said panel which is near the non-tapered half of said hollowed-out portion, and in which, further, said predetermined angle is 60°.

10. A fuel cell battery as defined in claim 5, in which each of said hollowed-out portions is provided with an array of pins for evenly distributing the flow of material across said hollowed-out portions.

11. A fuel cell battery as defined in claim 1, in which said fuel is a substance selected from the group consisting of hydrogen, hydrocarbons and alcohols, and in which said material for supporting combustion is a gas selected from the group consisting of oxygen and air.

* * * * *